(12) United States Patent
Calic et al.

(10) Patent No.: US 12,517,464 B2
(45) Date of Patent: Jan. 6, 2026

(54) MECHANICAL HOROLOGICAL MOVEMENT COMPRISING A MAGNETICALLY-PIVOTED BALANCE

(71) Applicant: The Swatch Group Research and Development Ltd, Marin (CH)

(72) Inventors: Milan Calic, La Conversion (CH); Jean-Pierre Mignot, Pontarlier (FR)

(73) Assignee: The Swatch Group Research and Development Ltd, Marin (CH)

( * ) Notice: Subject to any disclaimer, the term of this patent is extended or adjusted under 35 U.S.C. 154(b) by 559 days.

(21) Appl. No.: 18/050,277

(22) Filed: Oct. 27, 2022

(65) Prior Publication Data

US 2023/0195039 A1    Jun. 22, 2023

(30) Foreign Application Priority Data

Dec. 22, 2021    (EP) .................................... 21216851

(51) Int. Cl.
*G04B 31/004*    (2006.01)
*F16C 32/04*    (2006.01)

(52) U.S. Cl.
CPC ........ *G04B 31/004* (2013.01); *F16C 32/0421* (2013.01)

(58) Field of Classification Search
None
See application file for complete search history.

(56) References Cited

U.S. PATENT DOCUMENTS

| 5,783,885 A | * | 7/1998 | Post | F16C 39/063 |
| | | | | 310/90.5 |
| 9,030,070 B2 | * | 5/2015 | Marechal | G04B 17/32 |
| | | | | 310/90.5 |

(Continued)

FOREIGN PATENT DOCUMENTS

| CH | 714 370 A2 | 5/2019 |
| CH | 714 600 A2 | 7/2019 |

(Continued)

OTHER PUBLICATIONS

European Search Report Issued Jun. 9, 2022, in European Application 21216851.2 filed on Dec. 22, 2021 (with English Translation of Categories of Cited Documents), 3 pages.

(Continued)

*Primary Examiner* — Regis J Betsch
*Assistant Examiner* — Michael James Walker
(74) *Attorney, Agent, or Firm* — Oblon, McClelland, Maier & Neustadt, L.L.P.

(57) ABSTRACT

A mechanism including a rotary element and a magnetic device for guiding this rotary element in rotation arranged so as to exert a radial magnetic biasing force on the rotary element when a central axis of this rotary element undergoes a radial movement relative to a given axis of rotation. The magnetic device includes a pair of annular magnets the first annular magnet of which is carried by the rotary element and the second annular magnet is carried by a structure of the mechanism. The second annular magnet is parallel and axially superimposed with the first annular magnet when the central axis of the rotary element is coincident with the axis of rotation, the first and second annular magnets being arranged in magnetic attraction so as to impart on one another an axial magnetic force and a radial magnetic force.

9 Claims, 5 Drawing Sheets

(56) References Cited

U.S. PATENT DOCUMENTS

| | | | | |
|---|---|---|---|---|
| 9,778,619 B2* | 10/2017 | Zaugg | ............... | G04B 5/184 |
| 2007/0201317 A1 | 8/2007 | Houlon | | |
| 2016/0281778 A1* | 9/2016 | Li | ............... | H02K 7/09 |
| 2017/0343043 A1* | 11/2017 | Walsh | ............... | F16C 32/0417 |

FOREIGN PATENT DOCUMENTS

| | | | | |
|---|---|---|---|---|
| CN | 106030422 A | | 10/2016 | |
| CN | 108679084 A | * | 10/2018 | ......... F16C 32/0417 |
| DE | 1 204 144 B | | 10/1965 | |
| EP | 3 767 397 A1 | | 1/2021 | |
| FR | 1.276.204 A | | 11/1961 | |
| FR | 1.314.364 A | | 1/1963 | |
| JP | 2016-85072 A | | 5/2016 | |
| JP | 2019-95442 A | | 6/2019 | |
| WO | WO 2006/045824 A2 | | 5/2006 | |

OTHER PUBLICATIONS

Office Action issued Nov. 28, 2023, in corresponding Japanese Patent Application No. 2022-179449 (with English Translation), 10 pages.

Combined Chinese Office Action and Search Report issued May 10, 2025 in Chinese Patent Application No. 202211654428.9, 9 pages.

* cited by examiner

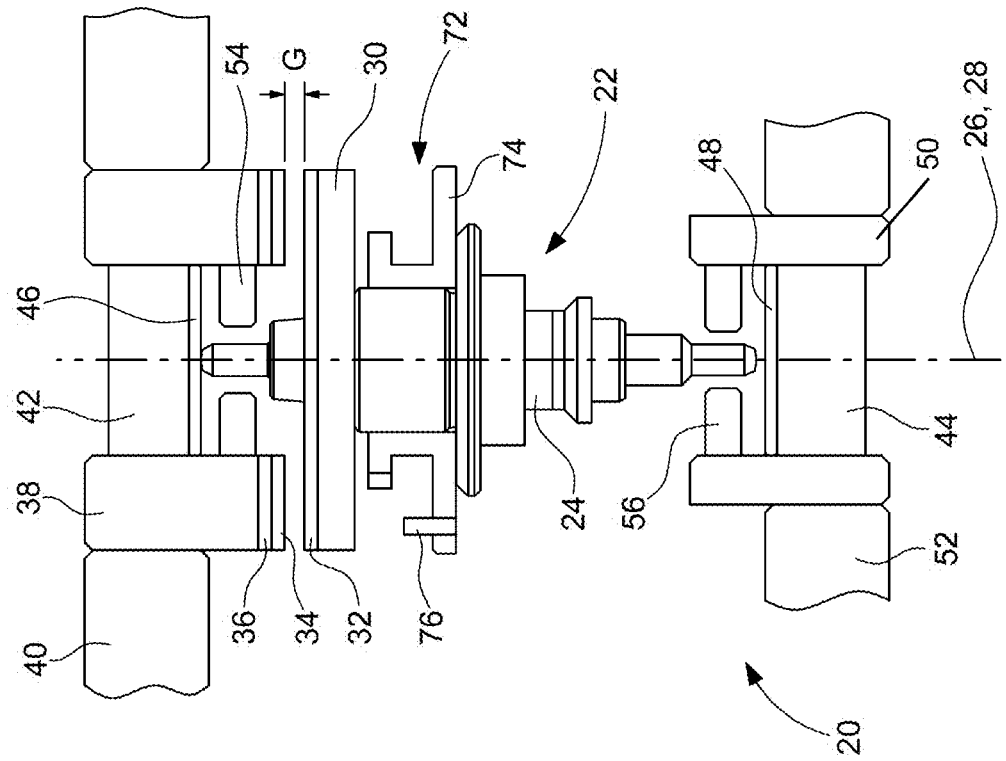
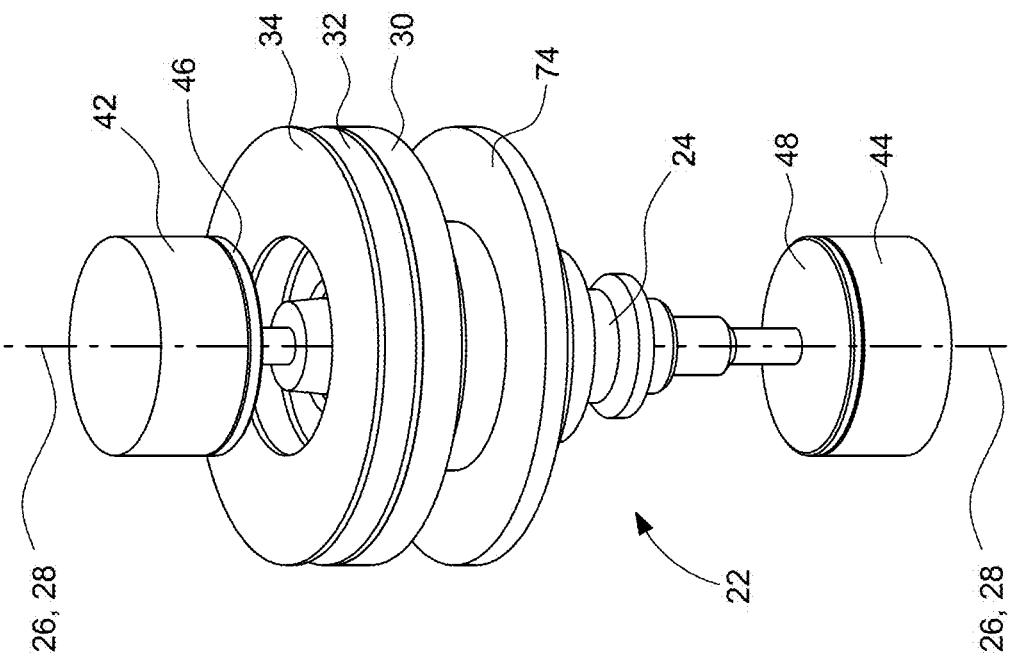

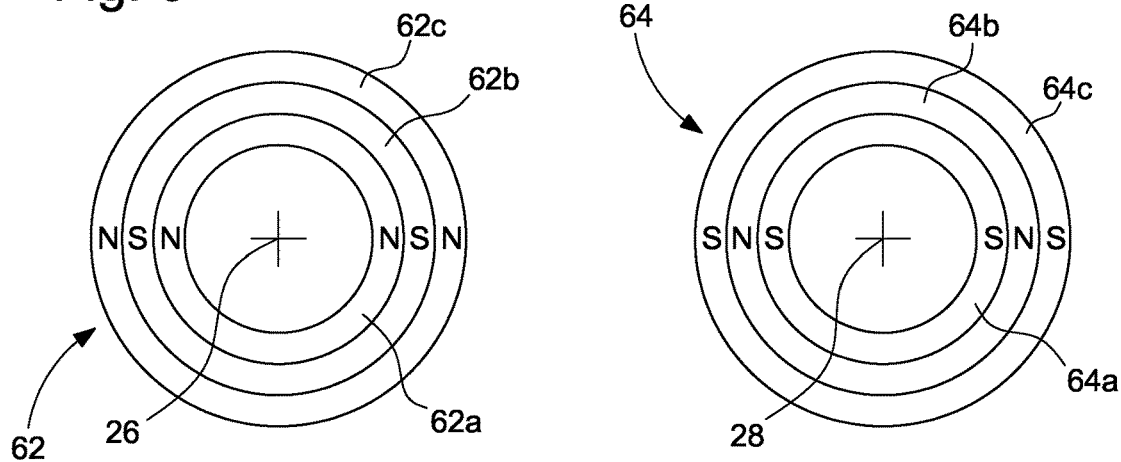
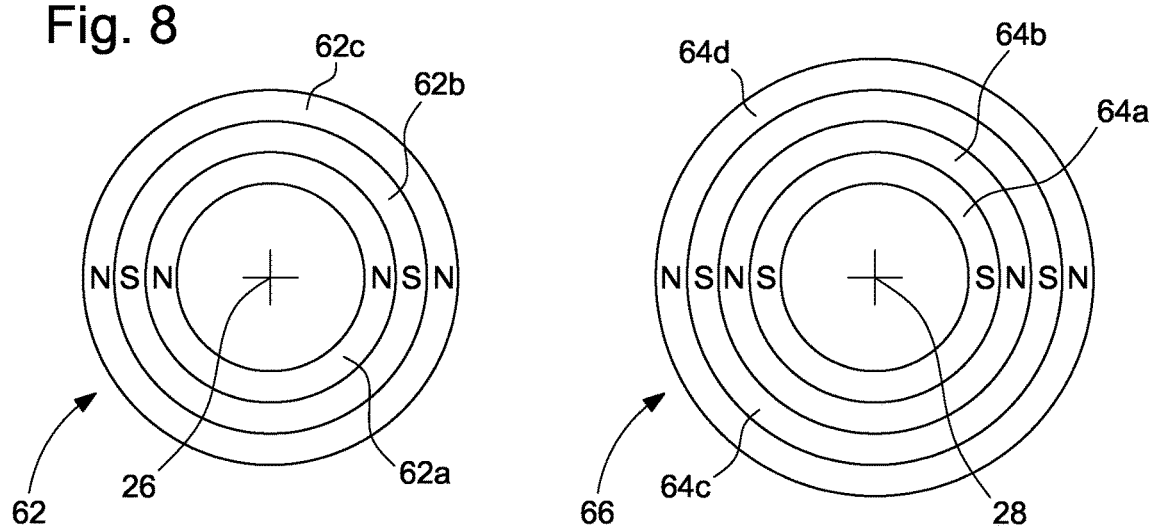
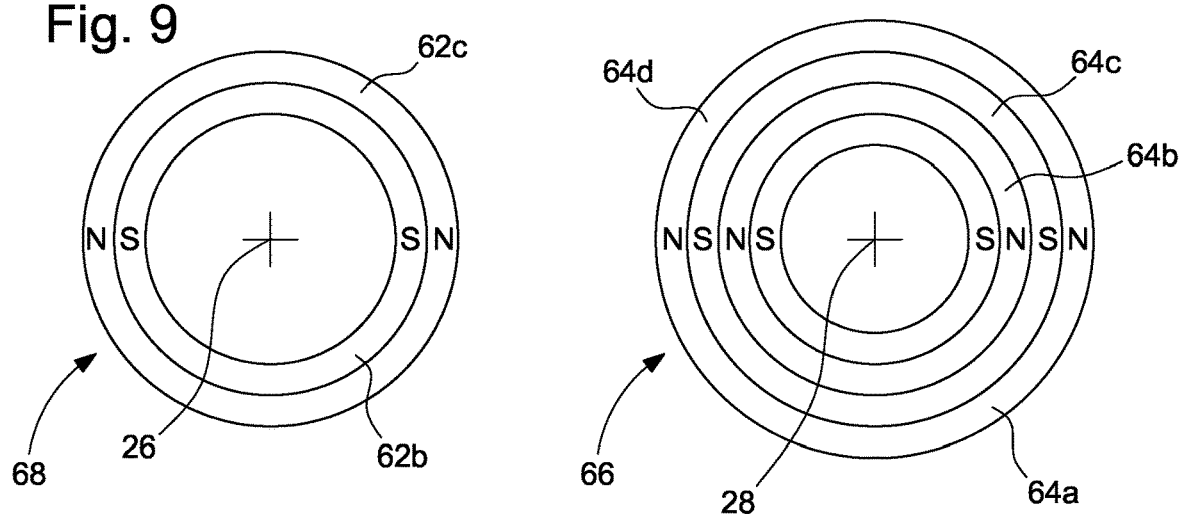

MECHANICAL HOROLOGICAL MOVEMENT COMPRISING A MAGNETICALLY-PIVOTED BALANCE

CROSS-REFERENCE TO RELATED APPLICATION

This application claims priority to European Patent Application No. 21216851.2 filed on Dec. 22, 2021, the entire disclosure of which is hereby incorporated herein by reference.

TECHNICAL FIELD OF THE INVENTION

The invention relates to the field of pivoting rotary elements in micromechanical applications, in particular in the watchmaking field. In particular, the invention relates to a mechanical horological movement comprising a mechanical resonator whose balance is magnetically pivoted, i.e. it is guided in rotation essentially by a magnetic device.

Technological Background

A method for pivotally guiding a horological component, in particular a balance, and a device for pivotally guiding such a horological component are known from the document WO 2012/062524. This document suggests directing a balance according to a given axis of rotation using a magnetic pivot guide device, formed by a pair of magnetic pivots. In FIG. 1, a mechanical resonator 2 formed by a balance 4 associated with a spring 3 is represented, this balance being formed by an inertial mass 4a and a shaft 6 which is provided with two magnetic pivots 6a, 6b to guide the balance in rotation, these two magnetic pivots being guided in rotation by two magnetic bearings formed respectively by two permanent magnets 10 and 12. For example, these magnets are formed by an alloy of rare-earth materials, in particular SmCo or NdFeB. In particular, they are made of a material known under the reference VAC677_HR. The shaft 6 of the balance is made of a material having a high magnetic permeability, for example a steel. Advantageously, a carbon steel, known under the reference 20_AP, may be used. One of the two magnets should be more powerful than the other one, so that one of the two pivots 6a, 6b of the shaft 6 is in contact with the most powerful magnet 10 (or with an intermediate endstone, for example a disc made of a polished hard material such as a synthetic ruby), while the other pivot remains at a short distance from the least powerful magnet 12 (or from an intermediate protective disc of this magnet, in particular a common endstone) and therefore remains normally without contact with the corresponding magnetic bearing. Such an arrangement for magnetically guiding a balance-spring in rotation has major advantages, in particular by reducing frictions in comparison with two common mechanical bearings.

FIG. 2 shows the theoretical curve of a magnetic biasing force FM as a function of a radial movement X of the balance 4 from the axis of rotation 8 of this balance for the magnetic guide device of the type represented in FIG. 1. The axis of rotation of the balance is defined by the geometric axis passing through the middle of the two magnets 10 and 12. One could observe that the function $F_M(X)$ is substantially linear for small movements. Thus, with such an arrangement, the magnetic biasing force increases proportionally with a given radial movement of the balance from its axis of rotation. This poses a problem of centring the balance 2, because the biasing force is low for small movements of the balance from its predefined axis of rotation. In addition, this problem of centring the balance is worsened by the fact that common magnets often have inhomogeneities at the millimetric scale. Yet, the diameter of the magnets 10, 12 is in the range of one millimetre. This centring problem poses a problem for the interaction of the balance with the escapement associated with this balance.

SUMMARY OF THE INVENTION

An objective of the present invention is to solve the problem of centring the magnetic bearings guiding small-sized rotary elements in rotation, in particular in the watchmaking industry and more specifically the centring problem for a rotational/pivotable magnetic guidance of the balance of a mechanical resonator incorporated in a mechanical horological movement.

To this end, the invention relates to a mechanism comprising a rotary element and a magnetic device for guiding this rotary element in rotation, this magnetic device being arranged so as to exert a radial magnetic biasing force on the rotary element when a central axis of this rotary element undergoes a radial movement relative to an axis of rotation which is predefined for the rotary element in the mechanism. According to the invention, the magnetic device comprises a pair of annular magnets the first annular magnet of which is carried by the rotary element, so that its centre remains coincident with said central axis, and the second annular magnet is carried by a structure of the mechanism so that its centre remains coincident with said axis of rotation. The second annular magnet is parallel and at least partially axially superimposed with the first annular magnet when the central axis of the rotary element is coincident with the axis of rotation, these first and second annular magnets being arranged in magnetic attraction so as to impart on one another a first axial magnetic force and, substantially as soon as the central axis of the rotary element deviates radially from the axis of rotation, a first radial magnetic force.

Thanks to the features of the invention, the magnetic guide device allows centring the rotary element radially in an effective manner, so as to limit, in normal operation, any radial movement of the central axis of the rotary element relative to the axis of rotation. Indeed, two annular magnets superimposed and arranged in magnetic attraction allow obtaining a radial biasing force that is already relatively high form small radial movements of the rotary element relative to the axis of rotation provided for in the mechanism for this rotary element.

According to an advantageous embodiment, the magnetic device further comprises at least one first end magnet which is axially arranged opposite a first end of a shaft of the rotary element, this shaft being formed at least partially by a soft ferromagnetic material or a magnetic material so that the first end magnet exerts a second axial magnetic force, magnetically-attractive, on the shaft and, when the central axis of the rotary element is radially remote from the axis of rotation, also a second radial magnetic force on this shaft, the second axial magnetic force having the same direction as the first axial magnetic force.

According to a preferred embodiment, the first annular magnet has, on the side of the second annular magnet, a first plurality of annular areas having alternate polarities and the second annular magnet has, on the side of the first annular magnet, a second plurality of annular areas having alternate polarities, at least two annular areas of the first plurality of annular areas being, when the central axis of the rotary element is coincident with the axis of rotation, substantially entirely axially superimposed with two respective annular areas of the second plurality of annular areas and in magnetic attraction with these two respective annular areas.

BRIEF DESCRIPTION OF THE FIGURES

The invention will be described hereinafter in more details by means of the appended drawings, provided as non-limiting examples, wherein:

FIG. 3 is a partial perspective view of a first embodiment of a mechanism according to the invention;

FIG. 4 is a side view, partially in section, of the mechanism of FIG. 3;

FIG. 6 represents a planar view of the first magnet and the second magnet of a pair of annular magnets forming the magnetic device for guiding a balance-spring in rotation in a first variant of the second embodiment;

FIG. 8 represents a planar view of the first magnet and the second magnet of a pair of annular magnets forming the magnetic device for guiding a balance-spring in rotation in a second advantageous variant of the second embodiment; and FIG. 9 represents a planar view of the first magnet and the second magnet of a pair of annular magnets forming the magnetic device for guiding a balance-spring in rotation in a third advantageous variant of the second embodiment.

DETAILED DESCRIPTION OF THE INVENTION

Referring to FIGS. 3 and 4, a first embodiment of a horological movement, partially represented, according to the invention will be described.

Figure 1:
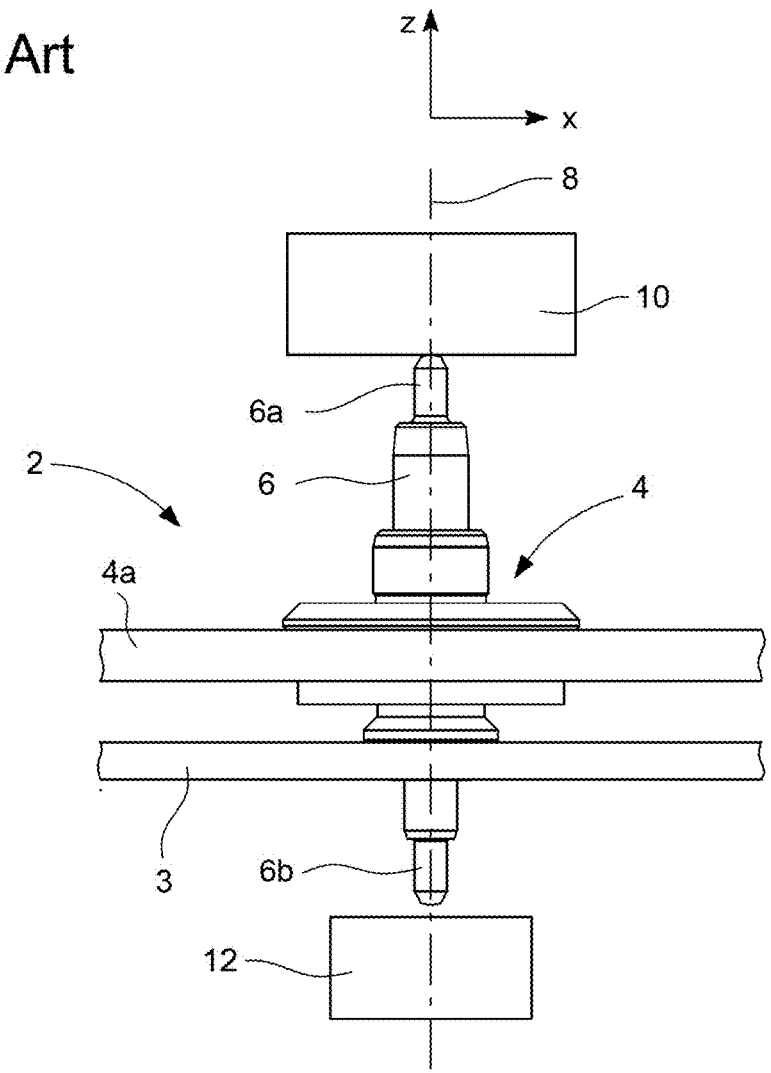
FIG. 1, already described, is a side view showing a magnetic device for guiding a balance-spring according to the prior art.

The horological movement 20 comprises a mechanical resonator, formed by a balance 22 having a shaft 24 defining a central axis 26 of the balance, and a magnetic device for rotatably/pivotally guiding the balance which comprises a pair of annular magnets, which consists of a first annular magnet 32, arranged on a support 30 carried by the shaft 24, and of a second annular magnet 34 arranged on a support 36, made of a soft ferromagnetic or non-magnetic material, which is bonded on a cylindrical tube 38 fitted, or fastened in another manner, into an opening of a plate 40 of the horological movement. It should be noted that the inertial mass of the balance and the spring of the mechanical resonator have not been represented in FIGS. 3 and 4 (for these elements, cf. FIG. 1). It should be noticed that a space is left free between the flange supporting the inertial mass of the balance and the support 30, that being so for the arrangement of a device 72 for coupling the balance with an escapement, in particular a plate 74 carrying a pin 76 intended to interact in a conventional manner with a pallet of the escapement (not represented).

In general, the first annular magnet 32 is carried by the balance 22 so that its centre remains coincident with the central axis 26, and the second annular magnet 34 is carried by a structure of the horological movement so that its centre remains coincident with the axis of rotation 28, which is predefined for the balance in the horological movement. In the represented variant, the support 30 is an annular support made of a material with a low magnetic permeability, in particular made of a paramagnetic or diamagnetic material, which is fixedly mounted on the shaft 24. In one variant, the support 30 comprises a thin annular plate made of a soft ferromagnetic material arranged directly beneath the first annular magnet 32. In FIG. 4, one could notice that the shaft 24, the support 30 and the first annular magnet 32 are represented in side view, not cut, while the other elements are represented in section according to a sectional plane comprising the axis of rotation 28. The balance 22 is represented in a centred position, as desired in normal operation, so that the central axis 26 of the shaft 24 is coincident with the axis of rotation 28.

The magnetic device for guiding the balance in rotation is arranged so as to exert a radial magnetic biasing force $F_R(X)$ on this balance when the central axis 26 of the balance undergoes a radial movement X relative to the axis of rotation 28. In the first embodiment, the second annular magnet 34 is parallel and substantially entirely axially superimposed with the first annular magnet 32 when the central axis 26 of the rotary element is coincident with the axis of rotation 28. These first and second annular magnets are arranged in magnetic attraction so as to impart on one another a first axial magnetic force and, substantially as soon as the central axis 26 of the balance features radially a deviation with the axis of rotation 28, a first radial magnetic force $F_R(X)$. To this end, the internal diameter and the external diameter of the first annular magnet and of the second annular magnet are substantially identical, preferably identical. As example, the internal diameter of the two annular magnets is comprised between 0.8 mm and 1.1 mm, and their external diameter is comprised between 1.5 mm and 2.2 mm.

In the first embodiment, each of the first and second annular magnets is a bipolar magnet, the two annular bipolar magnets having the same polarity (axial magnetic polarisation, with the same direction) so as to attract each other. These two bipolar magnets should be relatively thin, for example between 50 microns and 150 microns. Nonetheless, in other particular embodiments, they could be thicker to increase the magnetic power. In particular, these magnets could be cut with laser into plates magnetised perpendicularly to the general plane of the plate or be deposited into a thin layer. The first axial force and the first radial force depend in particular on the spacing/the distance G between the two annular magnets. Next, we will see graphs comparing the first radial force $F_R(X)$, which serves to the magnetic centring of the shaft 24 of the balance 22, for the first and second embodiments and two different spacings.

Afterwards, in a manner similar to the embodiment of the prior art described in the technological background, the magnetic device further comprise a first end magnet 42 and a second end magnet 44 which are respectively arranged axially opposite a first end (first pivot) and a second end (second pivot) of the shaft 24 of the balance 22. The first end magnet 42 is arranged inside the cylindrical tube 38 which carries the second annular magnet 34 (annular magnet fixed with respect to the structure carrying the first and second end magnets). Inside the cylindrical tube 38, a pierced stone 54 is also arranged which forms a first radial safety stop for the shaft 24, so as to limit a radial movement of this shaft in the event of an impact, more specifically of its first end. It should be noted that the first end magnet is covered with a plate 46 made of a hard material, a kind of an endstone which protects the first end magnet and which enables a pivoting with a lesser friction and relatively low wear. The second end magnet 44 is also arranged inside a cylindrical tube 50, which is fitted, or fastened in another manner, into an opening of a bridge 52, in particular a balance bridge. Inside the cylindrical tube 50, a pierced stone 56 is also arranged which forms a second radial safety stop for the shaft 24, so as to limit a radial movement of this shaft in the event of an impact, more specifically of its second end. The second end magnet is also covered with a plate 48 made of a hard material. As example the diameter of the two end magnets is comprised between 0.8 mm and 1.0 mm and their height is comprised between 0.4 mm and 0.6 mm.

Figure 2:
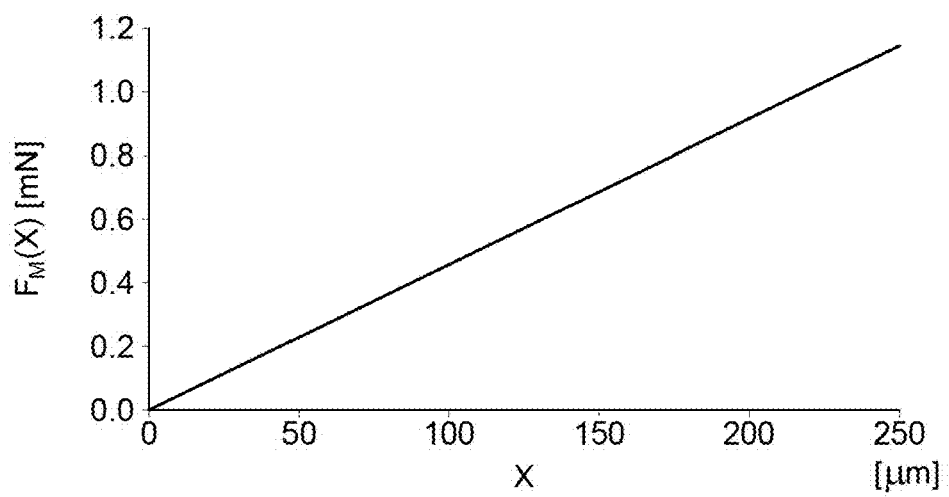
FIG. 2, already described, is a graph of the radial magnetic biasing force exerted by the magnetic device of FIG. 1 on the balance as a function of a radial movement of the latter.
Figure 5:
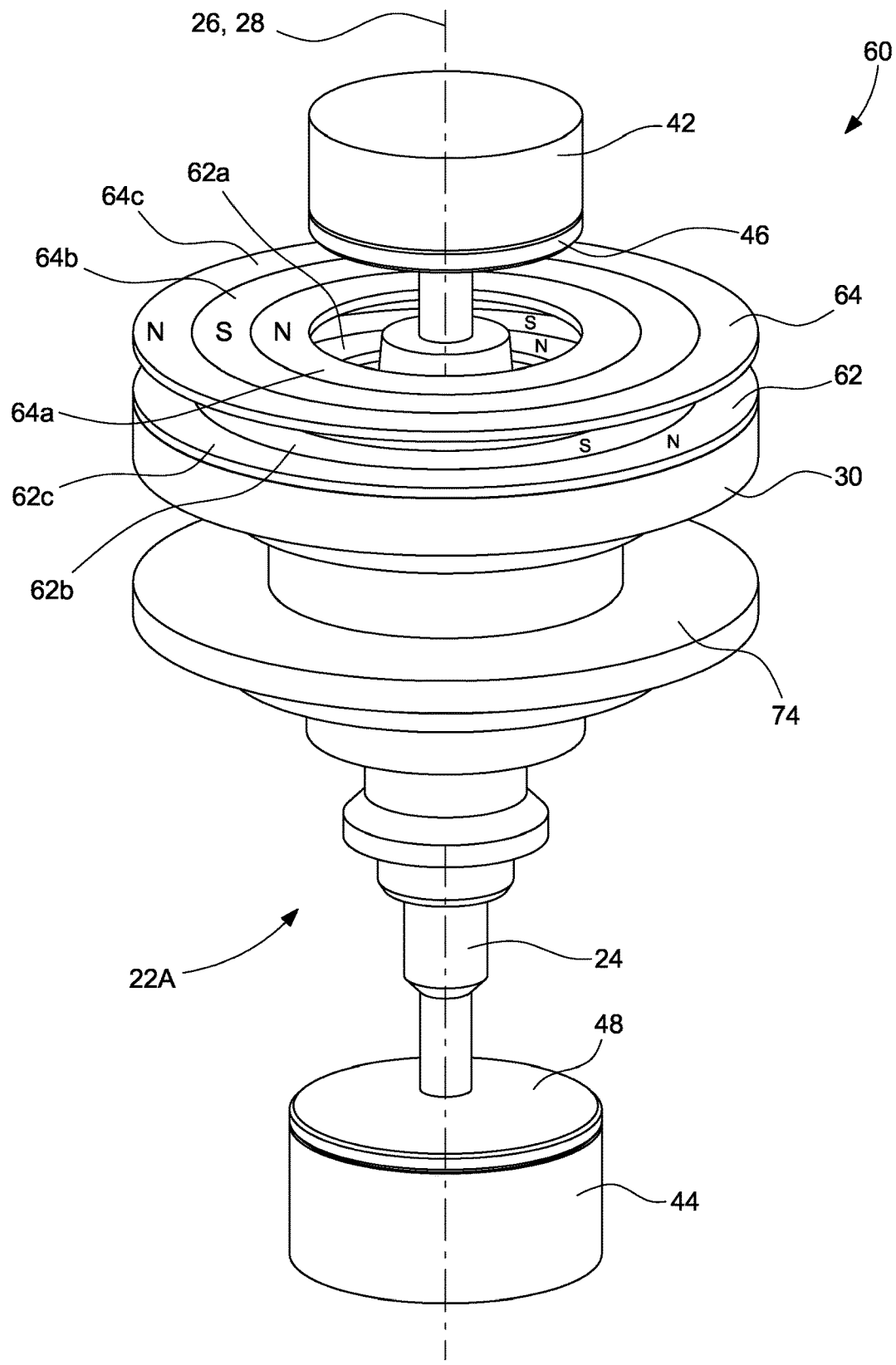
FIG. 5 is a partial perspective view of a second preferred embodiment of a mechanism according to the invention.

The shaft 24 is formed by a soft ferromagnetic material so that the first end magnet 42 exerts a second axial magnetic force on the shaft, magnetically-attractive and with the same direction as the first axial magnetic force, and, when the central axis 26 of the balance is radially remote from the axis of rotation 28, also a second radial magnetic force on this shaft. The second end magnet 44 exerts a third axial magnetic force on the shaft, magnetically-attractive and with a direction opposite to the direction of the second axial magnetic force, and, when the central axis 26 of the balance is radially remote from the axis of rotation 28, also a third radial magnetic force on this shaft. The magnitude of the third axial magnetic force is provided lower than the total magnitude of the first axial magnetic force and of the second axial magnetic force. The total magnitude of the second radial force and of the third radial magnetic force features a substantially linear dependency with the distance between the central axis 26 and the axis of rotation 28, as shown by the curve of FIG. 2. The end magnets 42 and 44 have respective central axes which are aligned and which define the axis of rotation 28 for the balance 22, this axis of rotation being thus predefined in the horological movement 20. The axis of rotation remains in a given fixed position with respect to the carrier structure of the balance 22, namely the plate 40 and the bridge 52.

It should be noticed that the supply of the pair of annular magnets according to the invention allows significantly reducing the dimensions of the first and second end magnets, more particularly of the first end magnet which should have a larger size than the second end magnet in the prior art (axial magnetic force exerted by the first end magnet on the upper shaft than that exerted by the second end magnet on this shaft in the prior art). Indeed, given the presence of the first axial magnetic force generated by the pair of annular magnets which is exerted in the same direction as the second axial magnetic force, the latter no longer needs to have a magnitude higher than that of the third axial magnetic force. In addition, as will be seen again later on, the arrangement of the pair of annular magnets according to the invention also allows reducing primarily the second radial magnetic force and also, preferably to a lesser extent given the remoteness of the second end magnet 44 from the pair of annular magnets, the third radial magnetic force while having a better magnetic centring of the mechanical resonator (balance-spring).

The previous description also allows considering two particular embodiments which are not represented in the figures. In the first particular embodiment, only one end magnet is provided besides the pair of annular magnets 32 and 34. In a first variant, the only end magnet is that one which is located on the same side of the inertial mass as the pair of annular magnets and which produces an axial magnetic force with the same direction as this pair of annular magnets. In a second variant, the only end magnet is the end magnet that is located on the side of the inertial mass opposite to the side where the pair of annular magnets is located and which produces an axial magnetic force with a direction opposite to that of the axial magnetic force generated by the pair of annular magnets. In this second variant, the axial magnetic force of the pair of annular magnets should be higher than in the first variant. In the second particular embodiment, the magnetic device for guiding the mechanical resonator incorporated in a mechanical movement in rotation consists only of the pair of annular magnets 32 and 34. Advantageously, a variant of this second particular embodiment comprises a pair of annular magnets according to the second embodiment which is described hereinafter. In the second particular embodiment, the endstone against which a pivot of the shaft of the balance bears in normal operation has a small flared dome for holding this pivot in a substantially central position, i.e. substantially on the axis of rotation provided for the balance. It should be noticed that such a small flared dome could advantageously be provided for in all of the embodiments of the invention.

Referring to FIGS. 5, 6, 8 and 9, a second embodiment of a mechanism 60 according to the invention will be described hereinafter. The references already described before will not be described again in details. In a first variant represented in FIGS. 5 and 6, the second embodiment differs from the first embodiment primarily in that the first annular magnet 62 has, on the side of the second annular magnet 64, a first plurality of annular magnetised areas 62a, 62b and 62c having alternate polarities (N, S, N) and the second annular magnet 64 has, on the side of the first annular magnet 62, a second plurality of annular magnetised areas 64a, 64b and 64c having alternate polarities (S, N, S). In general, when the central axis 26 of the balance 22A is coincident with the axis of rotation 28, at least two annular magnetised areas of the first plurality are substantially entirely axially superimposed with two respective annular magnetised areas of the second plurality and in magnetic attraction with these respective two annular areas. In the first variant, the first plurality comprises three annular magnetised areas which are respectively entirely superimposed with the three annular magnetised areas of the second plurality. In the partial perspective view of FIG. 5, the second annular magnet 64 is represented without its support, so that the external face of this magnet is seen. On the contrary, in FIG. 6, only the two annular magnets 62 and 64 are represented separately, viewed from the intermediate space between these two annular magnets. The second embodiment further features a difference at the two end magnets 42 and 44. While in the first embodiment these two end magnets are provided substantially with the same dimension and with the same magnetic power, in the second embodiment, the first end magnet 42 is provided with smaller dimensions which are smaller than those of the second end magnet 44, which is much further away from the pair of end magnets than the first end magnet which is located relatively close to this pair of annular magnets.

Advantageously, the two annular magnets 62 and 64 are made by a process of vapour phase deposition of an alloy of rare-earth materials in a vacuum enclosure, in particular by sputtering. For example, the thickness of the two multipolar annular magnets may be provided in the range 10 to 50 microns, in particular between 15 microns and 30 microns.

The permanent magnetisation of each rare-earth material alloy layers deposited over a support may be carried out in a plant arranged to be able to generate an intense magnetic field which crosses the deposited layer orthogonally, with the vectors of this magnetic field primarily in one direction or an opposite direction according to the different areas of the deposited layer, so as to obtain the magnetised annular areas with alternate polarities. Thus, bipolar annular magnetised areas with an axial magnetisation are obtained.

Figure 7A:
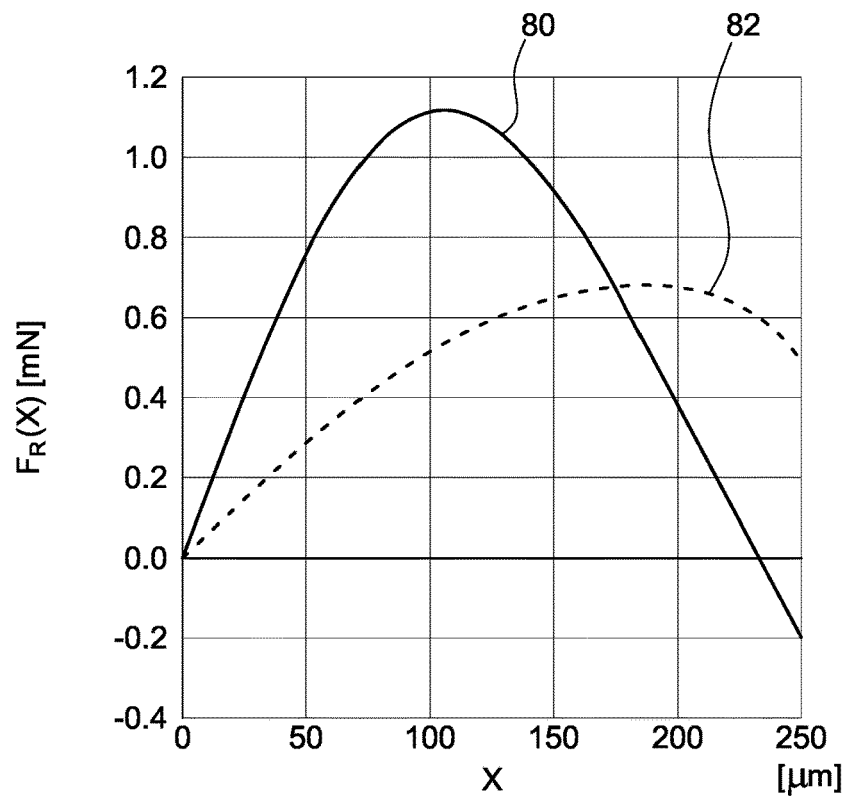
FIGS. 7A and 7B are graphs of a first radial magnetic biasing force exerted, in each of the first and second embodiments, by the pair of annular magnets on the balance as a function of a radial movement of the latter and respectively for two separation distances between the first and second annular magnets.
Figure 7B:
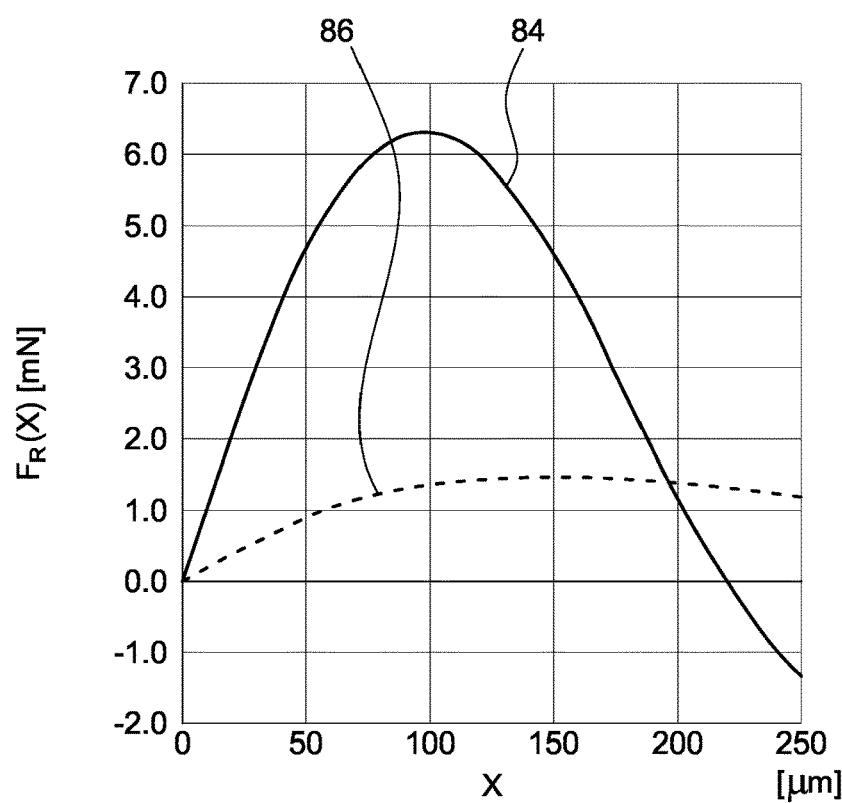

The second embodiment allows significantly increasing the magnetic centring force imparted by the two annular magnets, as it arises from FIGS. 7A and 7B. FIG. 7A is a graph representing the radial magnetic biasing force $F_R(X)$ generated by the pair of annular magnets, having a distance G equal to 0.2 mm (200 microns) therebetween, as a function of a radial movement X of the central axis 26 of the balance relative to the axis of rotation 28, the curve 80 shows this function for the second embodiment while the curve 82 shows this function for the first embodiment (the dimensions of the annular magnets being identical). One could notice that the force $F_R(X)$ adds to a force $F_E(X)$ which is a radial magnetic biasing force generated by the two end magnets (cf. FIG. 2, nonetheless note that the slope of the linear function depends on the magnetic power of the end magnets, in particular on their dimensions).

One could observe that the pair of annular magnets according to the invention rapidly exerts a relatively large biasing force $F_R(X)$ towards the axis of rotation, the initial slope of the curves 80 and 82 being relatively steep over the first 50 microns, in contrast with the linear function $F_E(X)$. In addition, one could observe that this slope is much steeper in the second embodiment than in the first embodiment (more than twice as steep), which is very advantageous to obtain an effective and accurate magnetic centring.

FIG. 7B is a graph similar to that of FIG. 7A, but for a distance G between the two annular magnets which is equal to 0.1 mm (100 microns). The curve 84 relates to the second embodiment while the curve 86 relates to the first embodiment. First of all, one could observe that the radial magnetic biasing force $F_R(X)$ has a maximum value (around X=100 microns) much larger for the distance G=0.1 mm than for the distance G=0.2 mm (almost six times as large). This results in a gradient, over the first 50 microns, higher for the curves 84 and 86 than for the curves 80 and 82 respectively, this gradient being much higher in the curve 84 than in the curve 86 (almost five times as high). This indicates that the second embodiment is particularly effective and advantageous with a smaller distance between the two annular magnets, which are arranged parallel to each other when the central axis 26 is parallel to the axis of rotation 28.

In FIGS. 8 and 9, similar to FIG. 6, two other variants of the second embodiment are represented. In the second variant of FIG. 8, in general, the first annular magnet 62 comprises N annular magnetised areas (62a, 62b, 62c), N being greater than 1, and the second annular magnet 66 comprises N+1 annular magnetised areas (64a, 64b, 64c, 64d), the N annular magnetised areas of the first annular magnet 62 being, when the central axis 26 of the balance is coincident with the axis of rotation 28, respectively axially superimposed with N annular magnetised areas, including an internal area (64a), of the second annular magnet 64, the second plurality of annular magnetised areas comprising an external area (64d) which extends radially beyond the first annular magnet 62. In the specific example represented in FIG. 8, the natural number N is equal to three, namely N=3. This second variant allows increasing the radial magnetic biasing force $F_R(X)$ in comparison with the first variant for the same first annular magnet 62 embedded on the element movable in rotation, namely on the balance 22A.

In the third variant of FIG. 9, in general, the first annular magnet 68 comprises N annular magnetised areas (62b, 62c), N being greater than 1, and the second annular magnet 66 comprises N+2 annular magnetised areas (64a, 64b, 64c, 64d), the N annular magnetised areas of the first annular magnet 68 being, when the central axis 26 of the rotary element (in particular the balance) is coincident with the axis of rotation 28, respectively axially superimposed with N inner annular magnetised areas (64b, 64c) of the second annular magnet 66 which are located between an external area (64d) and an internal area (64a) of the second plurality of annular magnetised areas of this second annular magnet, these internal and external areas extending radially respectively from both sides of the first annular magnet 68. In the specific example represented in FIG. 9, the natural number N being equal to two, namely N=2. This second variant allows obtaining a radial magnetic biasing force $F_R(X)$ that is relatively high for a first annular magnet, embedded on the balance, having smaller dimensions and thus a lower weight given that the support of this first annular magnet has smaller dimensions too. Thus, a very effective magnetic centring is obtained while barely increasing the inertia of the rotary element, in particular of the balance.

The invention claimed is:

1. A mechanism comprising a rotary element and a magnetic device for guiding said rotary element in rotation, said magnetic device being arranged so as to exert a radial magnetic biasing force on the rotary element when a central axis of said rotary element undergoes a radial movement relative to an axis of rotation which is predefined for the rotary element in the mechanism; wherein the magnetic device comprises a pair of annular magnets the first annular magnet of which is carried by the rotary element, so that its centre remains coincident with said central axis, and the second annular magnet is carried by a structure of the mechanism so that its centre remains coincident with said axis of rotation; and wherein the second annular magnet is parallel and at least partially axially superimposed with the first annular magnet when the central axis of the rotary element is coincident with the axis of rotation, the first and second annular magnets being arranged in magnetic attraction so as to impart on one another a first axial magnetic force and, substantially as soon as the central axis of the rotary element deviates radially from the axis of rotation, a first radial magnetic force, wherein the magnetic device further comprises at least one first end magnet which is axially arranged opposite a first end of a shaft of the rotary element, said shaft being formed at least partially by a soft ferromagnetic material or a magnetic material so that the first end magnet exerts a second axial magnetic force, which should be magnetically-attractive and with the same direction as the first axial magnetic force and, when the central axis of the rotary element is radially remote from the axis of rotation, also a second radial magnetic force on said shaft, and wherein the first annular magnet is arranged over an annular support made of a material with a low magnetic permeability, which is fixedly mounted on said shaft.

2. The mechanism according to claim 1, wherein the magnetic device comprises a second end magnet arranged opposite a second end of the shaft, which is formed by a soft ferromagnetic material, the second end magnet exerting a third axial magnetic force on the shaft, magnetically-attractive and with a direction opposite to the direction of the second axial magnetic force, and, when the central axis of the rotary element is radially remote from the axis of rotation, also a third radial magnetic force on said shaft, the magnitude of the third axial magnetic force being lower than the total magnitude of the first axial magnetic force and of the second axial magnetic force.

3. The mechanism according to claim 1, wherein the first annular magnet is made of a paramagnetic or diamagnetic material.

4. The mechanism according to claim 1, wherein the first annular magnet has, on the side of the second annular magnet, a first plurality of annular magnetised areas having alternate polarities and the second annular magnet has, on the side of the first annular magnet, a second plurality of annular magnetised areas having alternate polarities, at least two annular magnetised areas of the first plurality being, when the central axis of the rotary element is coincident with the axis of rotation, substantially entirely axially superimposed with two respective annular magnetised areas of the second plurality and in magnetic attraction with these two respective annular areas.

5. The mechanism according to claim 4, wherein each of said first plurality and said second plurality comprises three annular magnetised areas.

6. The mechanism according to claim 4, wherein the first annular magnet comprises N annular magnetised areas, N being greater than 1, and the second annular magnet comprises N+1 annular magnetised areas, the N annular magnetised areas of the first annular magnet being, when the central axis of the rotary element is coincident with the axis of rotation, respectively axially superimposed with N annular magnetised areas, including an internal area, of the second annular magnet, the second plurality of annular magnetised areas comprising an external area which extends radially beyond the first annular magnet.

7. The mechanism according to claim 4, wherein the first annular magnet comprises N annular magnetised areas, N being greater than 1, and the second annular magnet comprises N+2 annular magnetised areas, the N annular magnetised areas of the first annular magnet being, when the central axis of the rotary element is coincident with the axis of rotation, respectively axially superimposed with N inner annular magnetised areas of the second annular magnet which are located between an external area and an internal area of the second plurality of annular magnetised areas, these internal and external areas extending radially respectively from both sides of the first annular magnet.

8. A mechanism comprising a rotary element and a magnetic device for guiding said rotary element in rotation, said magnetic device being arranged so as to exert a radial magnetic biasing force on the rotary element when a central axis of said rotary element undergoes a radial movement relative to an axis of rotation which is predefined for the rotary element in the mechanism; wherein the magnetic device comprises a pair of annular magnets the first annular magnet of which is carried by the rotary element, so that its centre remains coincident with said central axis, and the second annular magnet is carried by a structure of the mechanism so that its centre remains coincident with said axis of rotation; and wherein the second annular magnet is parallel and at least partially axially superimposed with the first annular magnet when the central axis of the rotary element is coincident with the axis of rotation, the first and second annular magnets being arranged in magnetic attraction so as to impart on one another a first axial magnetic force and, substantially as soon as the central axis of the rotary element deviates radially from the axis of rotation, a first radial magnetic force, wherein the magnetic device further comprises at least one first end magnet which is axially arranged opposite a first end of a shaft of the rotary element, said shaft being formed at least partially by a soft ferromagnetic material or a magnetic material so that the first end magnet exerts a second axial magnetic force, which should be magnetically-attractive and with the same direction as the first axial magnetic force and, when the central axis of the rotary element is radially remote from the axis of rotation, also a second radial magnetic force on said shaft, wherein the first annular magnet has, on the side of the second annular magnet, a first plurality of annular magnetised areas having alternate polarities and the second annular magnet has, on the side of the first annular magnet, a second plurality of annular magnetised areas having alternate polarities, at least two annular magnetised areas of the first plurality being, when the central axis of the rotary element is coincident with the axis of rotation, substantially entirely axially superimposed with two respective annular magnetised areas of the second plurality and in magnetic attraction with these two respective annular areas, and wherein the first annular magnet comprises N annular magnetised areas, N being greater than 1, and the second annular magnet comprises N+1 annular magnetised areas, the N annular magnetised areas of the first annular magnet being, when the central axis of the rotary element is coincident with the axis of rotation, respectively axially superimposed with N annular magnetised areas, including an internal area, of the second annular magnet, the second plurality of annular magnetised areas comprising an external area which extends radially beyond the first annular magnet.

9. A mechanism comprising a rotary element and a magnetic device for guiding said rotary element in rotation, said magnetic device being arranged so as to exert a radial magnetic biasing force on the rotary element when a central axis of said rotary element undergoes a radial movement relative to an axis of rotation which is predefined for the rotary element in the mechanism; wherein the magnetic device comprises a pair of annular magnets the first annular magnet of which is carried by the rotary element, so that its centre remains coincident with said central axis, and the second annular magnet is carried by a structure of the mechanism so that its centre remains coincident with said axis of rotation; and wherein the second annular magnet is parallel and at least partially axially superimposed with the first annular magnet when the central axis of the rotary element is coincident with the axis of rotation, the first and second annular magnets being arranged in magnetic attraction so as to impart on one another a first axial magnetic force and, substantially as soon as the central axis of the rotary element deviates radially from the axis of rotation, a first radial magnetic force, wherein the magnetic device further comprises at least one first end magnet which is axially arranged opposite a first end of a shaft of the rotary element, said shaft being formed at least partially by a soft ferromagnetic material or a magnetic material so that the first end magnet exerts a second axial magnetic force, which should be magnetically-attractive and with the same direction as the first axial magnetic force and, when the central axis of the rotary element is radially remote from the axis of rotation, also a second radial magnetic force on said shaft, wherein the first annular magnet has, on the side of the second annular magnet, a first plurality of annular magnetised areas having alternate polarities and the second annular magnet has, on the side of the first annular magnet, a second plurality of annular magnetised areas having alternate polarities, at least two annular magnetised areas of the first plurality being, when the central axis of the rotary element is coincident with the axis of rotation, substantially entirely axially superimposed with two respective annular magnetised areas of the second plurality and in magnetic attraction with these two respective annular areas, and wherein the first annular magnet comprises N annular magnetised areas, N being greater than 1, and the second annular magnet comprises N+2 annular magnetised areas, the N annular magnetised areas of the first annular magnet being, when the central axis of the rotary element is coincident with the axis of rotation, respectively axially superimposed with N inner annular magnetised areas of the second annular magnet which are located between an external area and an internal area of the second plurality of annular magnetised areas, these internal and external areas extending radially respectively from both sides of the first annular magnet.

\* \* \* \* \*